April 14, 1964    J. COLPO    3,129,018
TRACTOR-TRAILER CONNECTING DEVICE
Filed Nov. 1, 1961    2 Sheets-Sheet 1
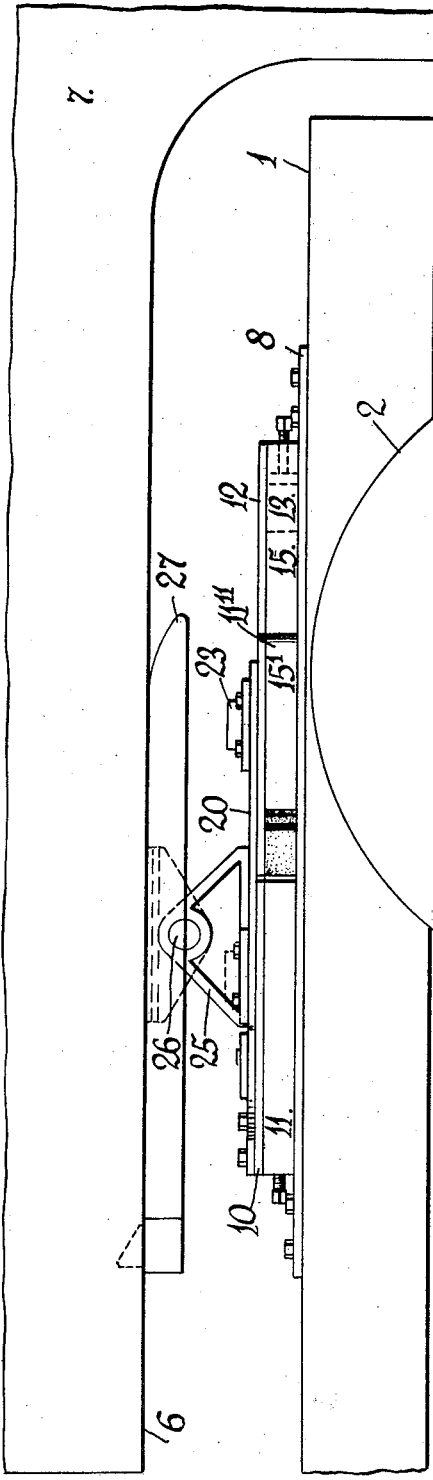
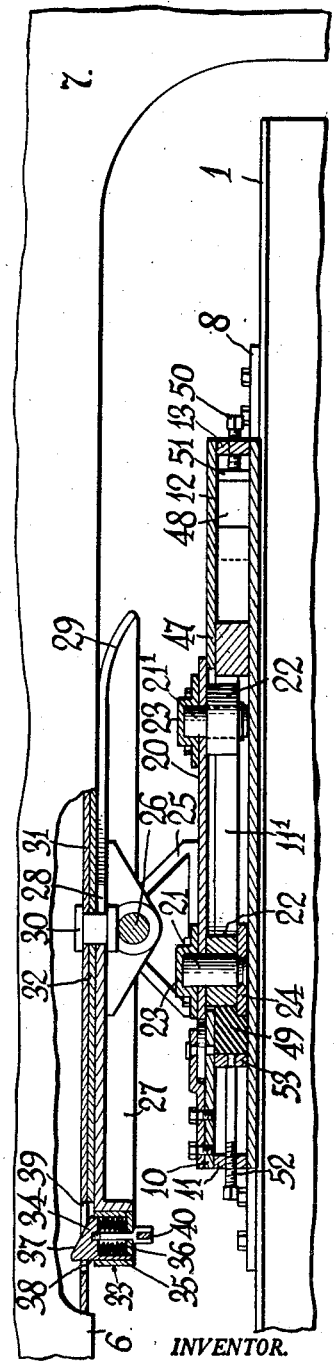
Fig.1.
Fig.2.
INVENTOR.
Jesse Colpo,
BY Christel & Bean
ATTORNEYS

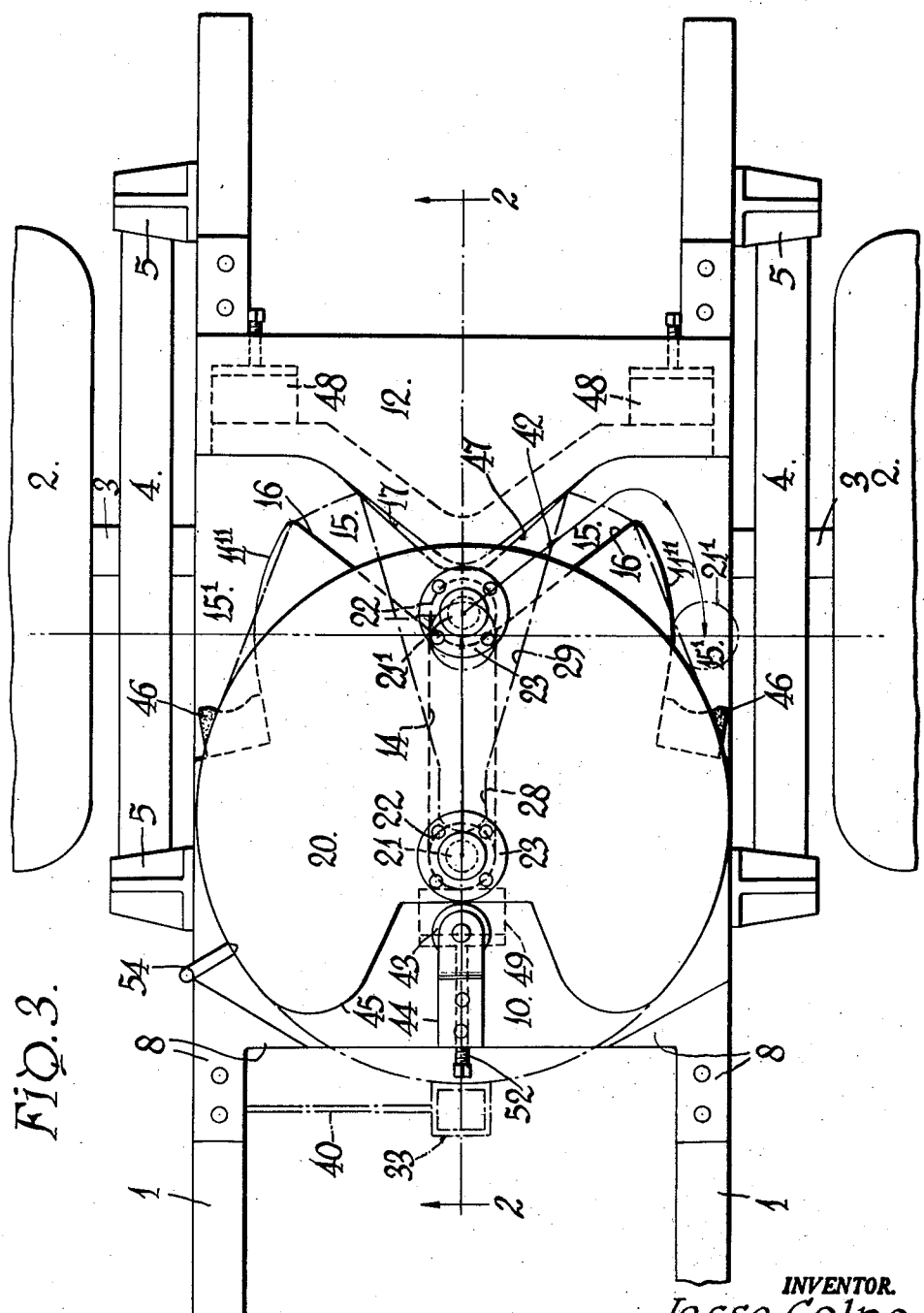

United States Patent Office 3,129,018
Patented Apr. 14, 1964

3,129,018
TRACTOR-TRAILER CONNECTING DEVICE
Jesse Colpo, Newark, Del., assignor to Colpo Safety Wheel Inc., Buffalo, N.Y., a corporation of Delaware
Filed Nov. 1, 1961, Ser. No. 149,242
13 Claims. (Cl. 280—438)

This invention relates generally to the coupling art, and more specifically to a new and useful tractor-trailer connection device automatically extensible upon relative turning movement between the tractor and trailer, thereby to provide added clearance to accommodate such relative turning while enabling the trailer to be positioned closely adjacent the tractor when in line therewith.

Heretofore, it has been the practice to provide the clearance required for turning at all times. Often a round nose trailer is used. If a square nose trailer is used it is at all times separated from the tractor a distance sufficient to permit turning of the tractor relative to the trailer. This poses a serious economic loss, because the maximum length of tractor-trailers is limited by law, and space otherwise available for cargo is lost.

Accordingly, the primary object of this invention is to provide a practical, workable connection device of general utility automatically extensible upon relative turning between the tractor and the trailer to provide the extra clearance required to acommodate such turning movement, while permitting the use of a square nose trailer positioned extremely close to the tractor when in line therewith.

By way of example, with my invention a full foot of added cargo space is possible without increasing the overall length of the carrier. At least 88 cubic feet of added volume becomes available, and a square nose trailer can be as close as 6 to 8 inches from the tractor when they are in line. With my invention, the trailer is moved back from the tractor a full foot by the time the tractor has turned 45 degrees relative to the trailer. Beyond that point, added clearance is not required because the front corner of the trailer has passed the tractor.

Accordingly, another object of my invention is to provide a tractor-trailer connection device automatically operable upon relative turning movement between the tractor and the trailer to move the forward end of the trailer rearwardly a distance sufficient to provide the necessary clearance between the tractor and trailer at the critical 45 degree angle therebetween, and thereafter operable to maintain the trailer in its rearwardly spaced position upon relative rotation beyond the critical 45 degree point.

Still another object of my invention is to provide a tractor-trailer connection device automatically extensible as aforesaid and providing resiliently yieldable cushioning means absorbing shock, both upon forward and rearward movements of the tractor relative to the trailer, and upon maximum relative turning therebetween.

It is also an object of my invention to provide an automatically extensible tractor-trailer connection device offering stable support for the attached trailer at all positions of the tractor relative to the trailer.

An additional object of my invention is to provide the foregoing in a construction which is durable and dependable through a long life, which is easily operated and maintained, and which is relatively inexpensive, and thereby economically competitive with conventional units, in view of the results produced.

In one aspect thereof, a tractor-trailer connection device constructed in accordance with my invention is characterized by the provision of a floor, adapted to be carried by a tractor for movement therewith, a turntable mounted on the floor for rotation relative thereto, trailer attaching means carried by the turntable for rotation therewith, means causing the turntable to move rearwardly relative to the floor to a predetermined rearward position thereon during relative turning between the turntable and the floor through a predetermined acute angle, and means thereafter constraining the turntable to remain in its rearward position on said floor during relative turning therebetween beyond such predetermined angle.

In another aspect thereof, a tractor-trailer connection device constructed in accordance with my invention is characterized by the provision of a floor adapted to be mounted on a tractor for movement therewith, a turntable mounted on the floor for rotation relative thereto, trailer attaching means carried by the turntable for rotation therewith, and means causing the turntable to move rearwardly relative to the floor during relative rotation therebetween, the last-named means comprising pin and slot means carried, one by the turntable, and the other by the floor, the slot means including a first slot portion extending generally lengthwise of the part by which it is carried, and a pair of second slot portions extending obliquely beyond one end of the first slot portion on opposite sides thereof in the manner of a Y, and the pin means including a pair of pins spaced apart lengthwise of the part by which they are carried and engaging the slot means.

The foregoing and other objects, advantages and characterizing features of a tractor-trailer connection device constructed in accordance with my invention will become clearly apparent from the ensuing detailed description of a presently preferred embodiment thereof, taken in conjunction with the accompanying drawings illustrating the same wherein like reference numerals denote like parts throughout the various views, and wherein:

FIG. 1 is a fragmentary, side elevational view of a trailer connected to a tractor by a device of my invention;

FIG. 2 is a longitudinal sectional view through the connection device of FIG. 1, with portions of the tractor omitted and with part of the trailer broken away for clarity and ease of illustration being taken about on line 2—2 of FIG. 3; and FIG. 3 is a plan view of the connection device shown in FIGS. 1 and 2, but with the trailer attaching plate indicated in phantom only for clarity of illustration.

There is shown in the accompanying drawing the rearward end of a tractor having a pair of supporting frame members 1, and wheels 2 carried by an axle 3 journaled in conventional supports 4 on opposite sides of the tractor frame, the supports 4 being connected to frame members 1 by suitable brackets 5. The details of this arrangement are conventional whereby further explanation is unnecessary. The forward end or nose 6 of a trailer 7 extends over the tractor frame, as shown in FIGS. 1 and 2, and is connected to the tractor by the device of my invention which is as follows.

Frame members 1 are spanned by a plate 8, on which my connection device is mounted, my connection device comprising a guide floor in the form of a first plate 10 mounted on plate 8 in spaced relation thereto, as by vertical wall member 11, and a second plate 12 similarly positioned above plate 8 as by wall member 13.

Plate 10 is provided with a slot 14 extending lengthwise of the tractor frame, generally centrally thereof, and opening into a pair of obliquely, rearwardly extending slots 15 defined by the flaring rear edge 16 of plate 10 and by the converging forward edge 17 of plate 12.

Plates 10 and 12 thus comprise a guide floor or base for a turntable 20 which is mounted for rotation thereon, and for movement lengthwise thereof. This is accomplished by means of a pair of guide pins 21, 21' carrying rollers 22 engaging the sides of slots 14 and 15, the pins 21, 21' being journaled by appropriate means such as bearing caps 23. Slot 14 has side walls 11' extending downwardly from plate 10, but terminating short of plate 8, and pin 21 carries a washer 24, or the like, which engages beneath the side wall 11' of the slot 14 and thereby anchors turntable 20 to the guide floor plate 10.

A pair of support brackets 25 are carried by turntable 20 adjacent opposite sides thereof and journal a shaft 26, carrying a trailer mounting plate 27, rearwardly of pin 21 (FIG. 2). Plate 27 is similar to a conventional fifth wheel, having a central slot 28 with flaring mouth 29 to receive a kingpin 30 extending downwardly from the floor 31 of a trailer which also can have a bearing plate 32 on the under surface of floor 31. To this extent, mounting plate 29 and the associated trailer parts are conventional. However, it is essential to the proper operation of my connecting device that the trailer be locked against movement relative to the turntable 20. In other words, the trailer must be locked on its mounting plate 27, not only against lengthwise separation, which can be done by the usual kingpin lock, but also against rotation thereon. This is accomplished by providing mounting plate 27 with a latch mechanism 33, also of my invention, as more fully set forth in my pending application Serial Number 21,817, filed April 12, 1960, now Patent No. 3,037,792, dated June 5, 1962. This latch mechanism has a latch member 34 confined within a housing 35 carried on the front of mounting plate 27 and normally urged into latching position by means such as coil springs 36. Latch 34 has an upwardly and forwardly inclined rear surface 37, to facilitate latching engagement, with the trailer 1 but the forward surface 38 of latch 34 preferably is substantially vertical, and comprises a positive stop when the latch projects through opening 39 in the trailer floor 31. Thus, not only does latch 34 hold the trailer against rotation on mounting plate 27, but in addition it provides a positive lock against accidental separation, even if the kingpin lock (not illustrated, but conventional) should fail.

Latch 34 can be retracted, as by lever 40, and can be laterally cushioned with resiliently yieldable material. For these and other details of a preferred form of latch, reference is hereby made to my said co-pending application dealing specifically therewith.

In operation, when the tractor and trailer are in line, the guide pins 21, 21' are in the position shown in full lines in FIG. 3. That is to say, pin 21 is positioned at the forward end of slot 14, and pin 21' is positioned at the juncture of slot 14 with slots 15. However, immediately upon relative turning between tractor and trailer, pin 21' will move into and along one or the other of the oblique slots 15, depending upon the direction of such turning. Pin 21 will travel rearwardly along slot 14, with the result that turntable 20 and the attached trailer shift rearwardly on floor 10, 12, thereby providing added clearance as required to accommodate passage of the nose of the trailer by the tractor cab during such relative turning.

Thus, assuming for example that the tractor turns in a counter clockwise direction as viewed in FIG. 3, pins 21, 21' will move in the direction of the arrows 42, and the parts are so arranged that when pin 21' reaches the outer end of slot 15, the tractor and trailer will have reached the critical 45 degree relationship therebetween, which will present the edge of a square nose trailer closest to the tractor cab. Thereafter, further separation of tractor and trailer is unnecessary, and from that point on my connecting device simply accommodates relative rotation or turning. To this end, each of the slots 15 has a forward extension 15', provided with an inner side wall 11'' formed on a radius equal to the spacing between pins 21 and 21'. Pin 21 remains in slot 14, at the rearward end thereof, and pin 21' simply moves along wall 11'', whereby there is no further rearward movement.

Also, the trailer is supported solidly, because of the four-point support provided by pins 21, 21' and brackets 25, at all times.

In the construction shown, approximately 100 degrees of relative turning movement is accommodated. It will be apparent upon viewing the position of pins 21, 21' illustrated in phantom in FIG. 3, that unless some means are provided to prevent it turntable 20 could move forwardly of guide floor 10, 12 once the tractor and trailer have reached about 90 degrees of relative turning. Such uncontrolled forward movement is prevented by a control roller 43, carried by a bracket 44 secured to plate 10, engaging the forward edge 45 of turntable 20 which is shaped in the manner of a cam surface. Edge 45 engages the control roller 43 which rides therealong to prevent such forward movement of turntable 20 once it has turned to the point beyond which such forward movement otherwise would be possible.

Upon straightening out of the tractor and trailer after turning, pins 21, 21' simply move in the reverse direction, to restore the parts to the full line position shown in FIG. 3.

If the trailer should jackknife and swing through the full relative turning movement permitted by my connection device, it could cause considerable damage upon being stopped. Therefore, at each end of the slot extensions 15' I provide cushioning blocks 46 of resiliently yieldable material such as rubber. Should there be such jackknifing of the trailer, the pin 21' will engage one or the other of the blocks 46, to give a cushioned halt to such jackknifing.

Further, I provide a bumper 47 generally conforming to the rearward edge of the slots 15 but projecting slightly forwardly of the forward edge 17 of floor plate 12. Bumper 47 is backed up by cushioning blocks 48 of resiliently yieldable material, and pin 21' is adapted to bear against the resiliently yieldably supported bumper 47 to cushion the shock which otherwise would occur upon sudden forward movement of the tractor relative to the trailer. For example, if the tractor is trying to start up on ice, and suddenly burns through to the pavement, there will be an abrupt forward movement but it will be cushioned by the bumper 47, thereby avoiding shock to the device.

Similarly, I provide a cushioning block 49, of resiliently yieldable material such as rubber, at the forward end of slot 14. This block is engaged by pin 21, to absorb shock upon rearward movement of the tractor relative to the trailer, as when backing under the trailer to engage the same.

The position of bumper blocks 48 can be adjusted by screws 50, extending through side wall 13 and engaging mounting brackets 51. Similarly, the position of block 49 can be adjusted by screw 52 extending through wall 11 and engaging a plate 53 to which the block 49 is secured.

In addition, should it be desired to operate my connection device in the manner of the usual fifth wheel, a lock 54 is provided. Lock 54 engages turntable 20 in the manner of the lock 50 shown in my Patent 2,667,364, dated January 26, 1954. Lock 54 is normally disengaged. It it is engaged and latch 33 retracted, the device would operate as a conventional fifth wheel.

Accordingly, it is seen that my invention fully accomplishes its intended objects, and provides the necessary added clearance immediately, during the initial and critical 45 degrees of relative rotation. At the same time, the device is relatively simple, and can be applied to existing vehicles. While I have disclosed and described in detail only one, presently preferred embodiment, that has been done by way of illustration only, and without thought of limitation. Such modifications and variations as will occur to those skilled in the art are intended to be included within the scope of the appended claims.

Having fully disclosed and completely described my invention, and its mode of operation, what I claim as new is:

1. A tractor-trailer connection device comprising, a floor adapted to be mounted on a tractor for movement therewith, a turntable mounted on said floor for rotation relative thereto, trailer attaching means carried by said turntable for rotation therewith, means causing said turntable to move rearwardly relative to said floor to a predetermined rearward position thereon during relative rotation therebetween through a predetermined acute angle, and means thereafter constraining said turntable to remain in said rearward position on said floor during relative rotation therebetween beyond said predetermined angle.

2. A tractor-trailer connection device as set forth in claim 1, wherein said predetermined angle is about 45 degrees.

3. A tractor-trailer connection device as set forth in claim 1, wherein said means causing said turntable to move rearwardly comprise pin and slot means carried one by said turntable and the other by said floor.

4. A tractor-trailer connection device comprising, a floor adapted to be mounted on a tractor for movement therewith, a turntable mounted on said floor for rotation relative thereto, trailer attaching means carried by said turntable for rotation therewith, means causing said turntable to move rearwardly relative to said floor to a predetermined rearward position thereon during relative rotation therebetween through a predetermined acute angle, and means thereafter constraining said turntable to remain in said rearward position on said floor during relative rotation therebetween beyond said predetermined angle, wherein said means causing said turntable to move rearwardly comprise pin and slot means carried one by said turntable and the other by said floor and wherein said slot means comprise a first slot portion extending generally lengthwise of one of said turntable and said floor and a pair of second slot portions extending obliquely beyond one end of said first slot portion on opposite sides thereof, and wherein said pin means comprise a pair of pins spaced apart lengthwise of the other of said turntable and floor and engaging said slot means.

5. A tractor-trailer connection device as set forth in claim 4, wherein said pins are alined with said first slot portion when said turntable and said floor are in lengthwise alinement, and wherein one of said pins engages said first slot portion at all operative positions of said turntable on said floor and the other of said pins engages one of said second slot portions during relative rotation between said turntable and said floor through said predetermined angle.

6. A tractor-trailer connection device comprising, a floor adapted to be mounted on a tractor for movement therewith, a turntable mounted on said floor for rotation relative thereto, trailer attaching means carried by said turntable for rotation therewith, and means causing said turntable to move rearwardly relative to said floor during relative rotation therebetween, said last-named means comprising pin and slot means carried one by said turntable and the other by said floor, said slot means including a first slot portion extending generally lengthwise of one of said turntable and said floor and a pair of second slot portions extending obliquely beyond one end of said first slot portion on opposite sides thereof in the manner of a Y, and said pin means including a pair of pins spaced apart lengthwise of the other of said turntable and floor.

7. A tractor-trailer connection device as set forth in claim 6, wherein one of said pins is in engagement with said first slot portion at all operative positions of said turntable relative to said floor, and wherein the other of said pins is in engagement with one of said second slot portions during relative rotation between said turntable and said floor.

8. A tractor-trailer connection device as set forth in claim 6, wherein both of said pins are alined with said first slot portion when said turntable and said floor are alined, together with resiliently yieldable cushioning means at opposite ends of said first slot portion for engagement one by one of said pins during lengthwise movement of said floor in one direction and the other by the other of said pins during lengthwise movement of said floor in the opposite direction.

9. A tractor-trailer connection device comprising, a base adapted to be mounted on a tractor for movement therewith, a turntable mounted on said base for rotation relative thereto, trailer attaching means carried by said turntable for rotation therewith, and means causing said turntable to move rearwardly relative to said base during relative rotation therebetween through a predetermined angle, said last-named means comprising generally Y-shaped guide slot means in said base and pin means on said turntable, said slot means including a first slot portion extending generally lengthwise of said base and a pair of second slot portions extending obliquely rearwardly from one end thereof on opposite sides thereof, and said pin means including a pair of guide pins carried by said turntable in engagement with said slot means, said pins being alined with said first slot portion when said turntable is alined with said base, and one of said pins moving out of alinement with said first slot portion and along one of said second slot portions upon relative rotation between said turntable and said base.

10. A tractor-trailer connection device as set forth in claim 9, together with resiliently yieldable cushioning means at opposite ends of said first slot portion, the cushioning means at the rearward end of said first slot portion engaging said one guide pin upon forward movement of said base relative to said turntable, and the cushioning means at the forward end of said first slot portion engaging said one guide pin upon forward movement of said base relative to said turntable.

11. A tractor-trailer connection device as set forth in claim 9, together with means constraining said turntable against further movement lengthwise of said base during relative rotation therebetween beyond a predetermined acute angle, said last-named means comprising forwardly directed extensions of said second slot portions, said one guide pin moving from one of said second slot portions into the associated one of said extensions upon relative rotation between said turntable and said base beyond said predetermined angle, and means constraining the other of said guide pins to remain substantially fixed in position while said one guide pin is engaged in either of said extensions, said last-named means comprising a cam surface on said turntable engaging a cam follower fixed to said base.

12. A tractor-trailer connection device as set forth in claim 11, together with resiliently yieldable cushioning in said extensions comprising stops for said pins limiting relative rotation between said turntable and said base.

13. A tractor-trailer connection device as set forth in claim 4, wherein said trailer attaching means include a pair of support brackets carried by said turntable adjacent opposite sides thereof transversely of the lengthwise spacing of said pins.

References Cited in the file of this patent

UNITED STATES PATENTS

| | | |
|---|---|---|
| 2,652,262 | Sherry | Sept. 15, 1953 |
| 2,714,018 | Colpo | July 26, 1955 |
| 2,843,398 | Apgar | July 15, 1958 |